United States Patent [19]

Stease

[11] 3,876,060

[45] Apr. 8, 1975

[54] ROLL-UP CONVEYOR UNIT

[76] Inventor: Ralph E. Stease, 8921 Cavalier Dr., Cincinnati, Ohio 45231

[22] Filed: July 23, 1973

[21] Appl. No.: 381,788

[52] U.S. Cl............ 198/109; 193/35 TE; 193/35 F; 198/127 R; 198/139
[51] Int. Cl............................................ B65g 41/00
[58] Field of Search............ 198/109, 127, 139, 91, 198/94, 96, 105, 189, 233, 204; 193/35 TE, 35 F, 35 J, 35 R; 242/84.8, 77.1; 206/DIG. 25; 52/108

[56] References Cited
UNITED STATES PATENTS

| 1,875,375 | 9/1932 | Gotthardt et al. | 198/94 |
|---|---|---|---|
| 2,395,075 | 2/1946 | Smith | 198/233 |
| 2,793,736 | 5/1957 | Thomson | 198/127 |
| 3,596,785 | 8/1971 | Weatherford | 198/139 |
| 3,780,843 | 12/1973 | McGovern et al. | 193/35 TE |

FOREIGN PATENTS OR APPLICATIONS

| 1,115,904 | 10/1961 | Germany | 52/108 |

Primary Examiner—Evon C. Blunk
Assistant Examiner—Joseph E. Valenza
Attorney, Agent, or Firm—Wood, Herron & Evans

[57] ABSTRACT

A roll-up conveyor having rollers fixed between flexible link side rails that are rigid in the vertically downward direction when extended into use configuration, but flexible in the vertically upward direction to permit windup into storage configuration. When in the storage attitude, the roll-up conveyor is wound up inside a housing that includes guide structure which cooperates with the conveyor's side rails to wind up the conveyor in a predetermined spiral configuration within the housing. The flexible link side rails are structured such that the rollers cannot touch one another when the conveyor is in the storage attitude; this enables a drive mechanism connected with the rollers to provide a powered conveyor no matter how much of the roll-up conveyor has been paid out of the housing. As the roll-up conveyor is extended or paid out into the use attitude, the leading end of the conveyor is supported by a wheeled primary support frame fixed thereto, and the middle of the conveyor is supported by at least one wheeled secondary support frame telescopingly connected to the housing, to provide vertical stability. Each secondary support frame is particularly characterized by a floor plate over which the roll-up conveyor can slide as the initial section of the conveyor is extended or paid out from the storage attitude, and by an extender device that may automatically telescope the secondary frame away from the housing as the conveyor is paid out. Each support frame retracts into proximity with the housing when the roll-up conveyor is wound up. Further, the support frames are adjustable to allow the extended section of the roll-up conveyor to achieve multiple angular attitudes relative to ground level along its length.

17 Claims, 20 Drawing Figures

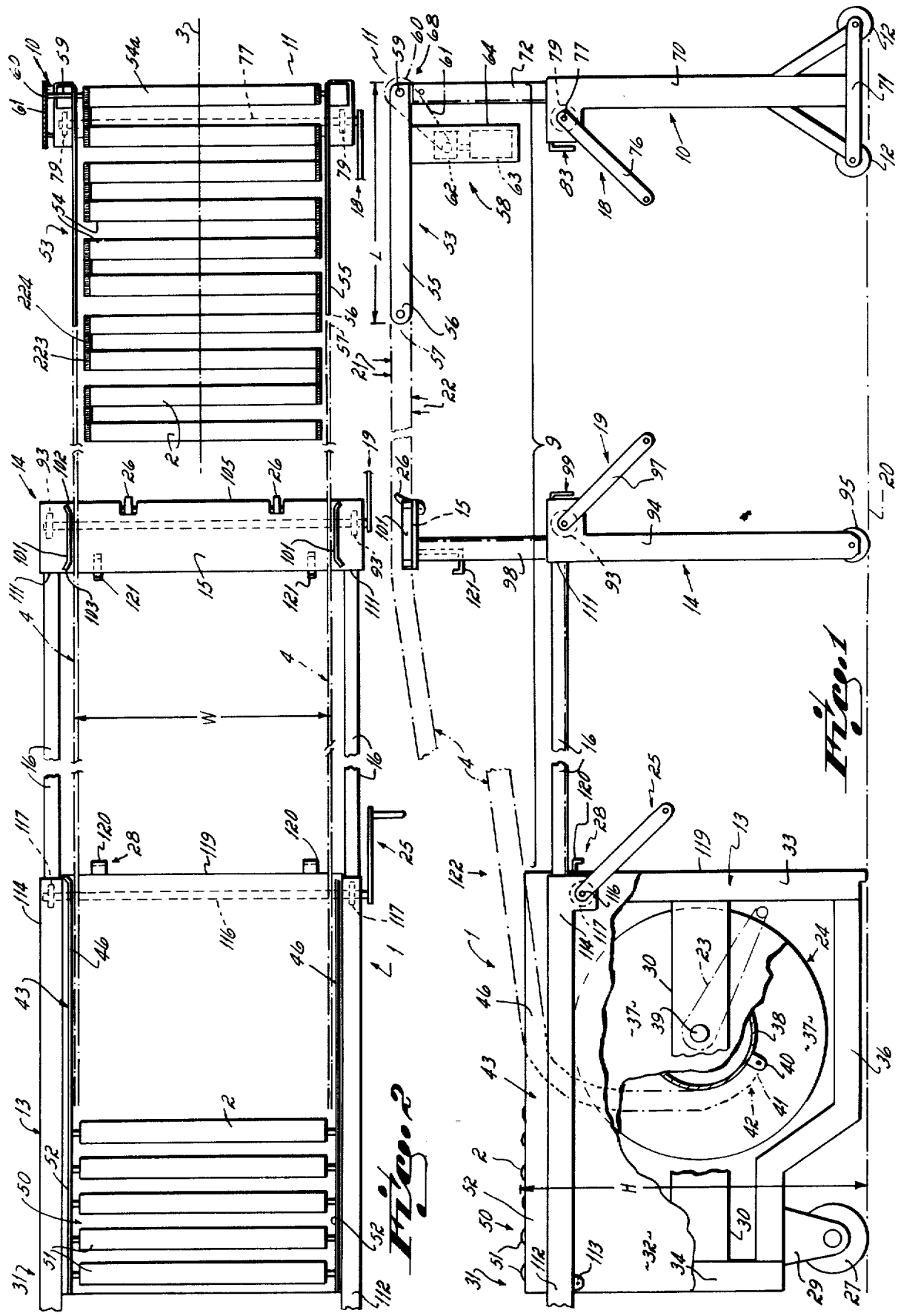

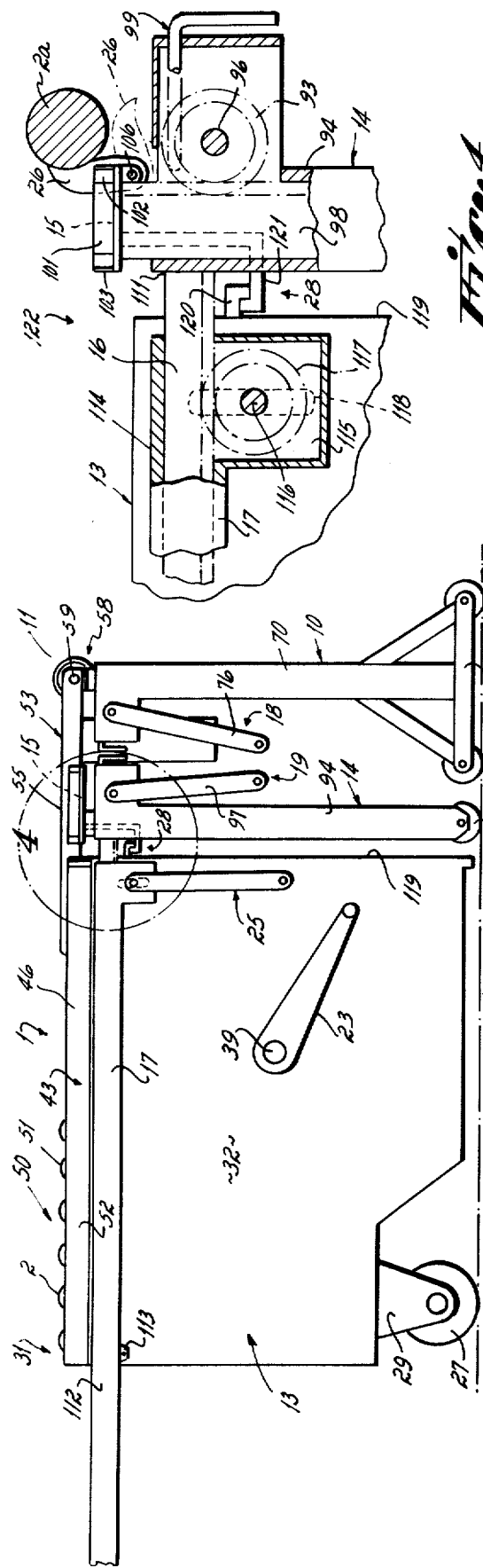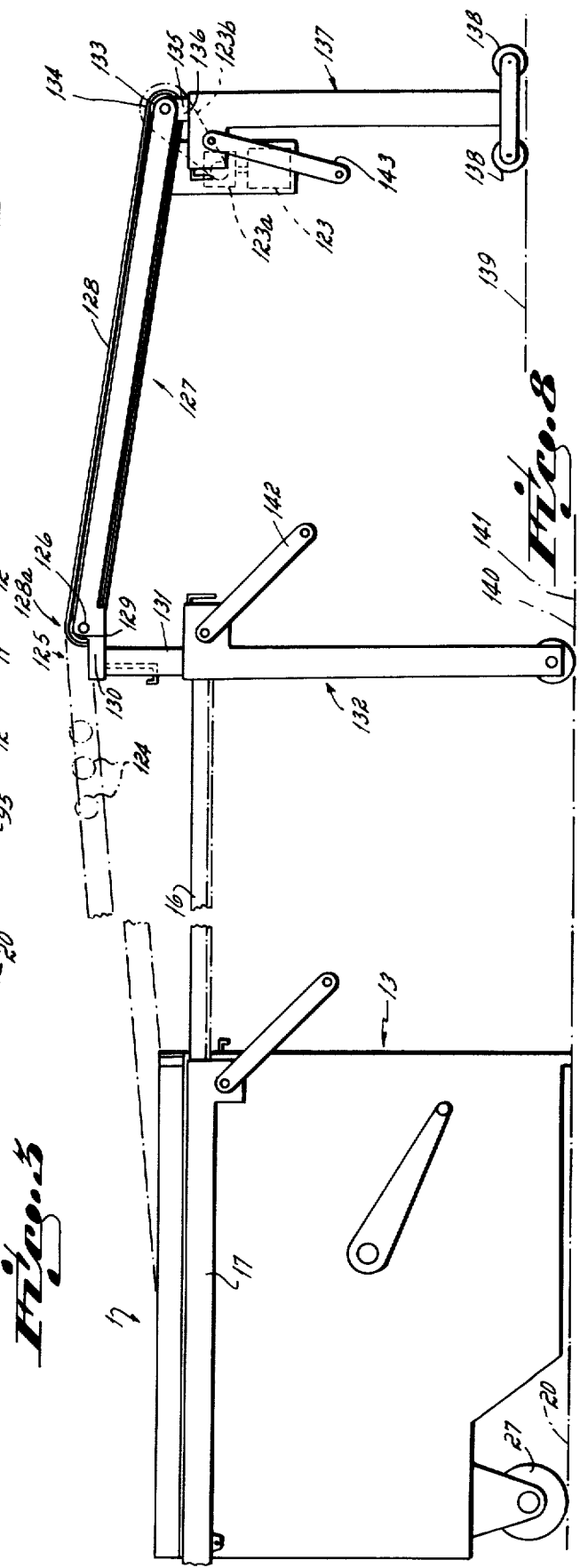

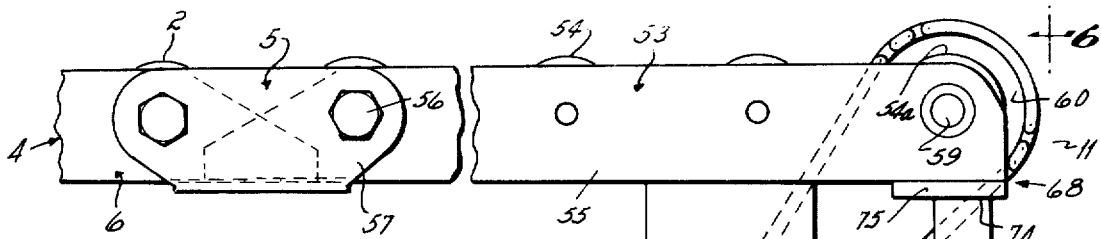
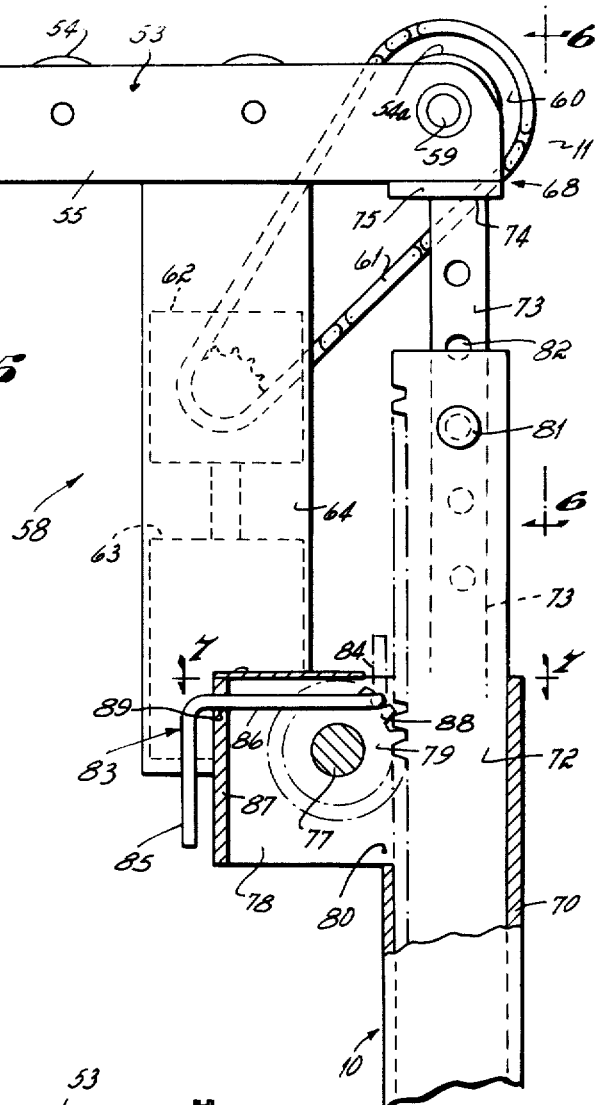
Fig. 5
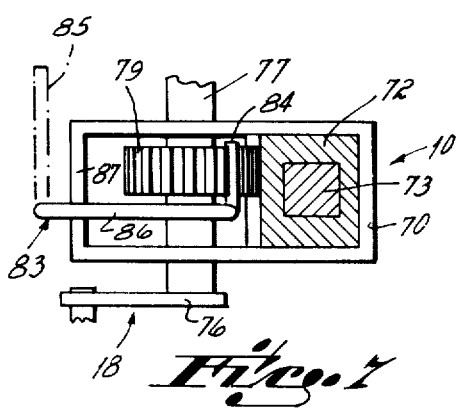
Fig. 7
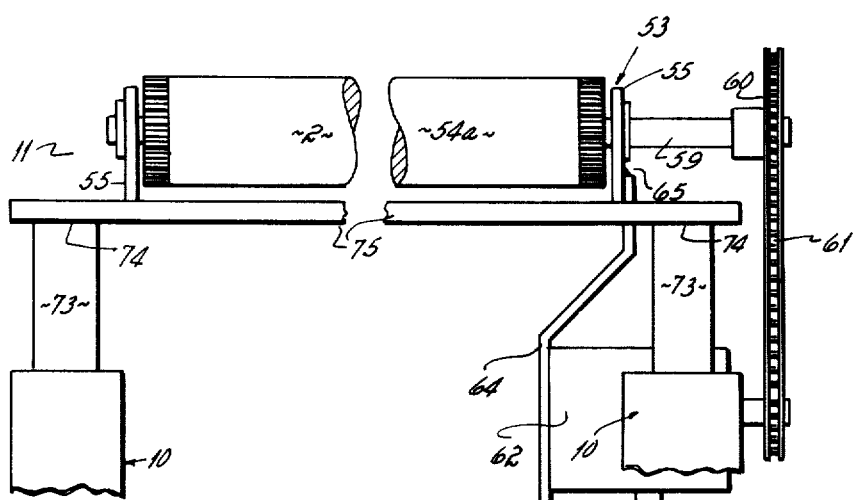
Fig. 6

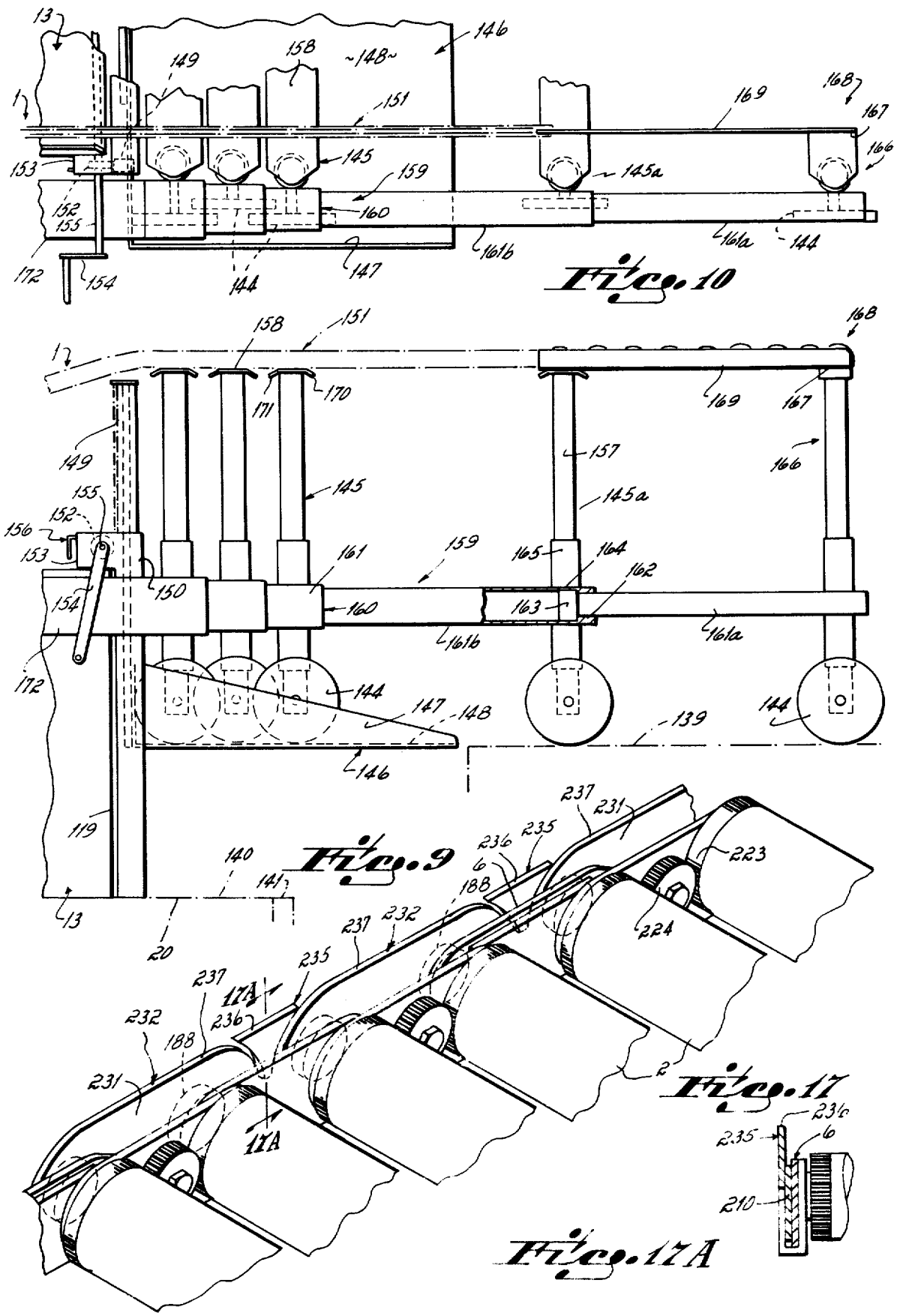

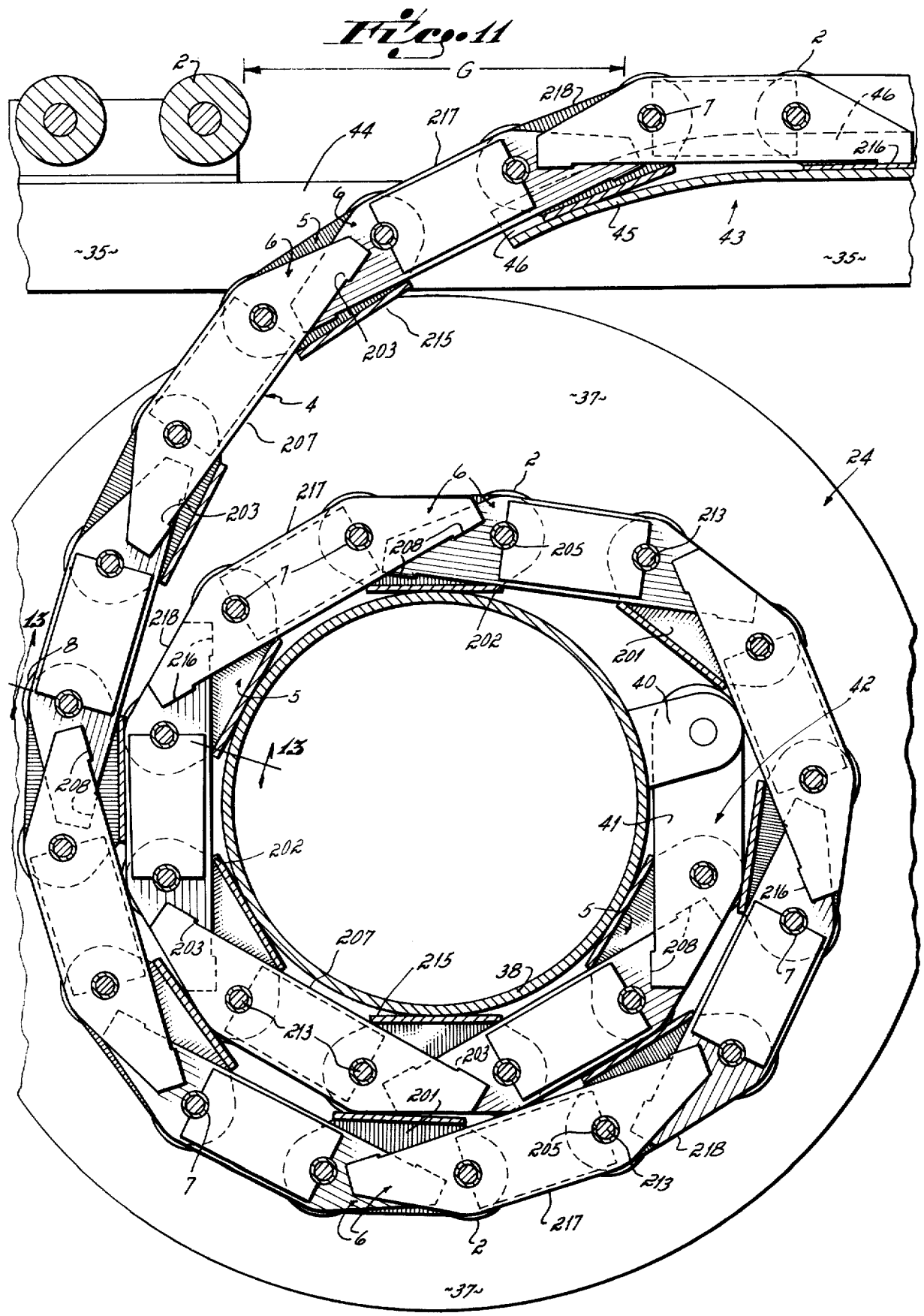

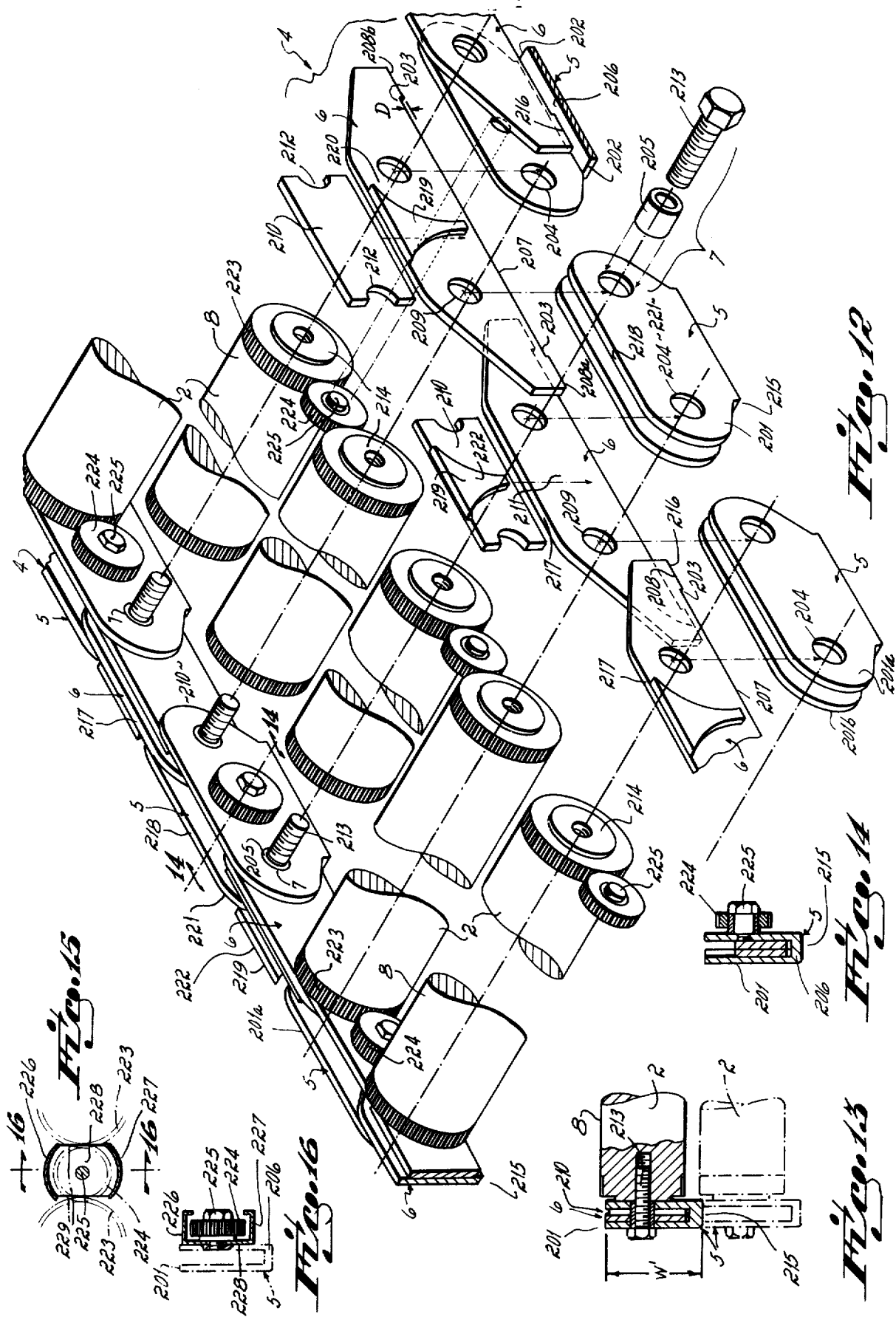

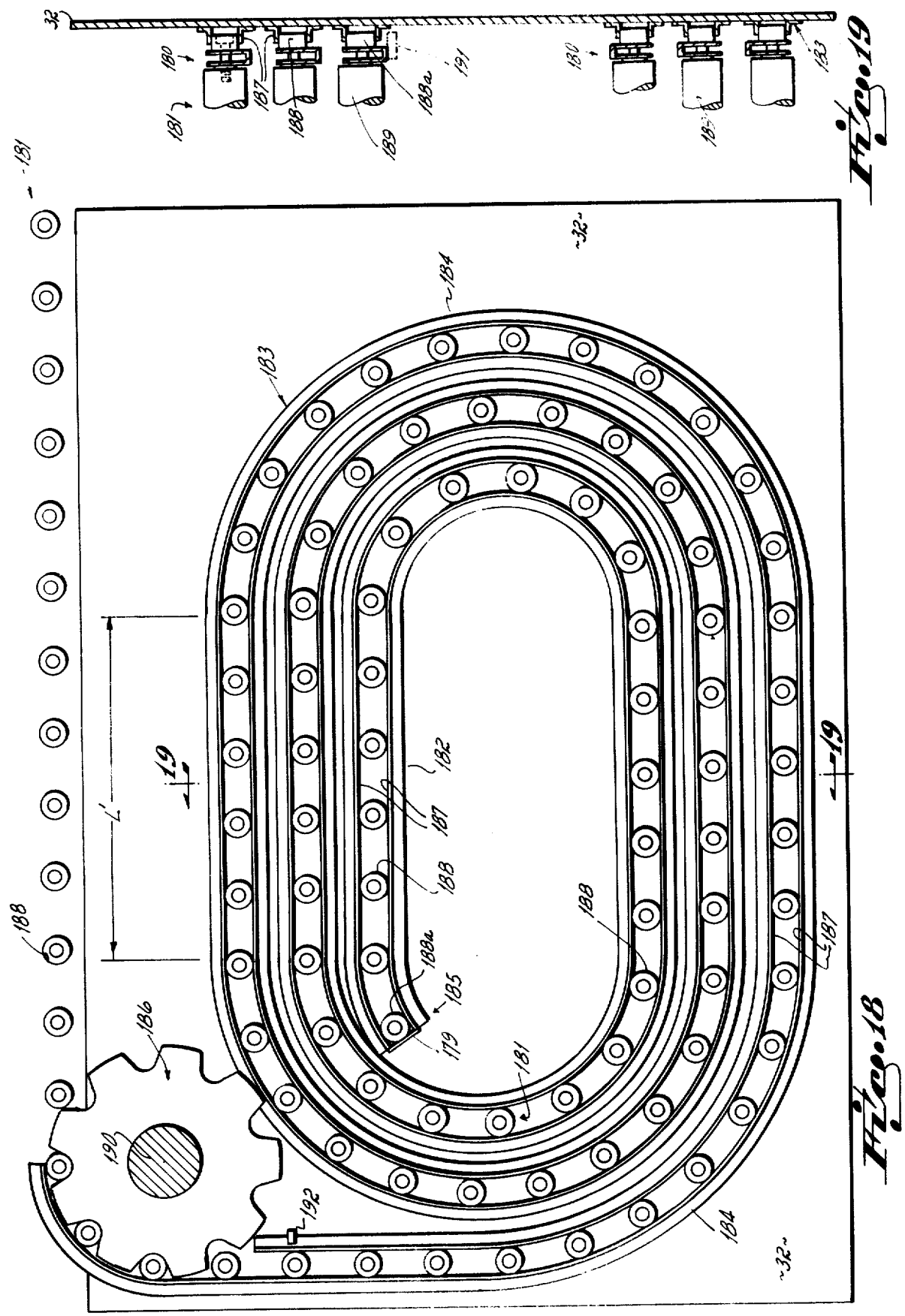

3,876,060

ROLL-UP CONVEYOR UNIT

This invention relates to conveyors. More particularly, this invention relates to a novel roll-up conveyor unit.

There are two basic types of so-called gravity conveyors. One is a skate wheel type conveyor and the other is a roller type conveyor. The skate wheel type conveyor basically incorporates a multiplicity of individual wheels mounted between fixed side rails, a number (e.g., three or four or more) of such wheels being disposed between the side rails on each transverse wheel axis along the conveyor's length. A roller type conveyor includes a plurality of rollers also mounted between fixed side rails, a single roller extending between the side rails on each transverse roller axis. The main difference between a roller type conveyor and a skate wheel type conveyor, therefore, is that a single roller is provided at a specific transverse axis location along the along the conveyor's length whereas multiple skate wheels are provided at a specific transverse axis location along the conveyor's length. The reference to a gravity type conveyor refers to the act that the skate wheel conveyor or the roller conveyor may be oriented angularly, however slightly, relative to ground level so that boxes or the like disposed on the conveyors will then roll downhill, i.e., from the higher end to the lower end, due to gravity.

Roller type conveyors may also be powered or driven, as opposed to relying solely on gravity for operation, as is well known to the art. Such a power drive roller conveyor incorporates a drive motor with the conveyor itself, the drive motor being engageable with the rollers by some kind of a gearing or drive system that positively drives each of the rollers along the conveyor's length at a controlled rotational rate. This structure allows boxes or the like to be positively moved along a flat portion or an uphill portion of the conveyor's length.

Skate wheel and roller type conveyors are particularly adapted for use in warehousing operations. Such conveyors are provided commercially in lengths of 8 feet or 10 feet or more, and the lengths are flat or horizontal relative to the conveying plane. The prefabricated conveyor lengths or sections are adapted to hook together into a continuous length conveyor run. The conveyor run may be totally flat or horizontal relative to ground level, or it may have portions thereof that are angularly disposed relative to ground level. However, any angular disposition of one section to another can only occur where that one section is hooked or connected together with that other.

One use of the prefabricated conveyor lengths discussed above is to interconnect various areas of a warehouse one with the other for movement of goods from that one area to the other. A second use is in connection with the loading and unloading of trailers or railroad cars at a warehouse's dock, the conveyor directly connecting the inside area of the warehouse with the inside area of the trailer or railroad car to facilitate loading and/or unloading. When not in use, the multiple conveyor sections are, of course, disassembled from the extended length conveyor run and the sections stacked one upon the other in parallel fashion in a suitable storage area. However, in each instance the erection and disassembly of a continuous length conveyor run must be manually accomplished because of the multiple sections, and this is usually a time-consuming and heavy task.

It has been an objective of this invention to provide a roll-up conveyor unit that is readily portable, where the roll-up conveyor is easily extendable to any length up to a maximum, adapts easily to multiple heights along its extended length, and is useful in warehousing operations, e.g., loading and unloading freight cargo vehicles.

It has been another objective of this invention to provide a roll-up conveyor unit where the roll-up conveyor is adapted to roll up in a controlled and predetermined spiral configuration inside a housing into a storage attitude.

It has been yet another objective of this invention to provide a roll-up conveyor unit characterized by an extendable roll-up conveyor length which may be wound up into storage attitude within a housing, that conveyor comprising power driven rolles along its full length.

It has been a further objective of this invention to provide a roll-up conveyor unit where the roll-up conveyor is adapted to be stored in spiral configuration within a housing, the roll-up conveyor being supported by at least one support frame connected to that housing and moved away from the housing in sequence as the conveyor is paid out from the housing, and the roll-up conveyor being adapted to multiple angular attitudes relative to ground level along its length by adjusting the support frame(s).

Other objectives and advantages of this invention will be more apparent from the following detailed description taken in conjunction with the drawings in which:

FIG. 1 is a diagrammatic longitudinal side view, partially broken away, of a power driven, roll-up conveyor unit of the roller type where the roll-up conveyor is in a substantially fully extended or use attitude in accord with the principles of my invention;

FIG. 2 is a top view of the conveyor unit shown in FIG. 1;

FIG. 3 is a side view similar to FIG. 1 but showing the roll-up conveyor in the fully retracted or storage attitude;

FIG. 4 is a blown-up detail section of the encircled area of FIG. 3 illustrating the secondary support frame;

FIG. 5 is a detailed side view of the primary support frame and power drive means for the conveyor unit shown in FIG. 1;

FIG. 6 is a front view taken along line 6—6 of FIG. 5;

FIG. 7 is a cross-sectional view taken along line 7—7 of FIG. 5;

FIG. 8 is a diagrammatic view similar to FIG. 1 except the roll-up conveyor is of the gravity type with a power driven belt at the leading end thereof;

FIG. 9 is a view similar to FIG. 1, but illustrating an alternative support frame embodiment for the conveyor's primary and secondary support frames, and showing the roll-up conveyor in the partially extended attitude;

FIG. 10 is a top view of the conveyor unit shown in FIG. 9;

FIG. 11 is an enlarged and more detailed view of the roll-up conveyor unit of FIG. 1 illustrating, in particular, the conveyor's side rails in rolled or storage attitude in a generally circular spiral configuration;

FIG. 12 is a broken away and exploded perspective view of a section of the roll-up conveyor illustrated in FIGS. 1 and 11;

FIG. 13 is a cross-sectional view taken along line 13—13 of FIG. 11;

FIG. 14 is a cross-sectional view taken along line 14—14 of FIG. 12;

FIG. 15 is a side view of an alternative drive train structure between rollers;

FIG. 16 is a cross-sectional view taken along line 16—16 of FIG. 15;

FIg. 17 is a partial perspective view showing an alternative link construction for the conveyor's side rails;

FIG. 17a is a cross sectional view taken along line 17a—17a of FIG. 17;

FIG. 18 is a side view similar to FIG. 11 but illustrating an alternative embodiment of the roll-up conveyor making use of the FIG. 17 link construction, the conveyor being rolled up in a generally elliptical spiral configuration; and FIG. 19 is a cross-sectional view taken along line 19—19 of FIG. 18.

GENERAL STRUCTURE AND OPERATION

The roll-up conveyor of this invention basically includes a multiplicity of rollers 2 aligned transverse to the conveyor's longitudinal axis 3, and held in fixed spatial relation between parallel side rails 4. The side rails 4 are structured so the conveyor 1 can be wound up into a predetermined, generally spiral configuration into a storage attitude when desired (see FIGS. 1 and 11), and paid out into an extended straight line or angularly disposed line configuration of substantially any intermediate length relative to its maximum length when a use attitude is desired (see FIG. 1). The conveyor's side rails 4 are each of a novel linkage 5, 6 structure that permits breaking of the side rails so the conveyor can be wound up when force is applied in an upward direction and prevents breaking of the side rails (i.e., maintains those side rails in a rigid, in-line attitude) when force is applied in a downward direction.

Each side rail's linkage structure is fabricated of support links 5 and connecting links 6 in alternating combination, each support link having a connecting link pinned at opposite ends in a manner that allows pivotal movement between successive links 5, 6. A roller 2 is interposed between the side rails 4 at each pivotal interconnection 7 of a support link 5 and a connecting link 6. This pivotal interconnection 7 is located so that the free surface 8 of each roller 2 extends substantially above the top edges of the side rails 4 in the conveyor's extended portion 9, thereby allowing boxes (not shown) or the like to be moved over the rollers in normal conveyor fashion. Also, this pivotal interconnection 7 is located so that each side rail 4 is supported on itself with the rollers 2 left free to rotate in the conveyor's spiral or wound up configuration, thereby allowing the rollers to be continuously powered throughout the conveyor's length if desired.

A primary support frame 10 is directly connected to the free end 11 of the conveyor 1, the primary support frame being provided with wheels 12 so that it may roll along the floor as the conveyor is paid out of housing 13 from storage position to extended position. At least one secondary support frame 14 is also provided for the conveyor 1, this intermediate support frame also having wheels to facilitate positioning same under the conveyor when it is extended. However, the secondary support frame 14 is not directly connected to the conveyor, i.e., the conveyor may slide over a floor plate 15 defined at the top of the secondary support frame. The secondary support frame 14 is interconnected with the conveyor's housing 13 by means of a horizontally disposed post 16 in the form of a rack. The rack 16 is adapted to telescope into (when the secondary frame 14 is retracted) and out of (when the secondary frame is extended) a sub-housing 17 fixed to the conveyor's housing 13. The rack 16, by virtue of interconnecting the secondary support frame 14 and housing 13, provides vertical stability to the secondary support frame as that frame functions to support the conveyor's side rails 4 when same are extended.

The primary 10 and secondary 14 support frames also are adapted to position the conveyor's side rails 4 at a desired elevation relative to floor level. Each such frame 10, 14 includes a crank 18, 19 mechanism that allows the height H of the conveyor 1 to be varied relative to the floor 20 level as desired since the support frames 10, 14 are vertically extendable and retractable. Further, the primary 10 and secondary 14 support frame structure, in combination with the conveyor's side rails 4, allows the overall extended length of the conveyor to take on different angular attitudes as required to conform the side elevational position of the conveyor to that desired by the operator. This, of course, is possible because the conveyor itself is rigid when force is applied in the vertically downward direction (as indicated by arrows 21), but is flexible when force is applied in the vertically upward direction (as indicated by arrows 22), due to the construction of the links 5, 6 that form side rails 4.

In use, the conveyor 1 is wound up into the housing 13 when storage is desired. The conveyor 1 is retracted into the housing 13 by means of retract crank 23 that rotates drum 24, the conveyor being rolled up in a controlled and predetermined spiral configuration inside the housing, see FIG. 11. The primary support frame 10 is retracted into proximity with the housing as the conveyor 1 is roller up as frame 10 is fixed to the conveyor's free end 11, and the secondary support frame 14 may be retracted by crank 25. The conveyor 1 is extended or paid out from the housing by an extender device (which includes extend crank 25 and rack 16) that forces secondary support frame 14 away from the housing 13 by means of fingers 26 pushing against a roller 2 of the conveyor, see FIG. 4, thereby automatically extending the support frames 10, 14 as the conveyor is paid out.

The housing 13 itself is provided with wheels 27 that cooperate with the primary frame's wheels 12, thereby allowing the housing 13 and conveyor 1 to be rolled from place to place when desired by an operator, see FIG. 3. The housing 13 is also provided with brake structure 28 that grounds the housing on the floor 20 when located in the final use location, thereb stabilizing the conveyor 1 in the use location.

SPECIFIC DESCRIPTION OF VARIOUS EMBODIMENTS

As is illustrated in FIGS. 1–6, one embodiment of the roll-up conveyor 1 includes a series of rollers 2 (skate wheels, not shown, may be used if desired for a gravity type roll-up conveyor) transversely disposed between flexible link side rails 4, the roll-up conveyor being adapted to roll up on drum 24 interiorly of housing 13. This housing 13 includes side walls 32, front and rear walls (not shown), and a housing frame that includes front end posts 33, rear end posts 34, roof braces 35 and floor braces 36. the housing 13, at the rear end thereof 31, carries wheels 27 suitably journalled to brackets 29.

The roll-up drum 24 is journalled by bearings (not shown) in cross brace members 30 disposed on each side of the housing 13 and interconnected between respective pairs of front 33 and rear 34 posts of the housing's frame. The rollup drum 24 includes side walls 37 and a core 38, the side walls 37 being spaced apart a distance only slightly greater than the width W of the conveyor 1, thereby providing means for allowing the conveyor to be rolled up in a controlled and predetermined storage attitude. The drum 24 is fixed to shaft 39 (which is journalled in the cross brace members 30), the shaft carrying the drum or retract crank 23 which is positioned exteriorly of the housing as illustrated in FIGS. 2 and 3. Note particularly that the drum's core 38 is provided with ears 40 on opposite sides thereof, these ears being interconnected with the conveyor's side rails 4 through links 41 at the trailing end 42 thereof; this structure, of course, provides a positive interconnection between the roll-up conveyor 1 and the drum 24. Note further, and as previously mentioned, that the drum's side walls 37 are separated one from the other a distance only slightly greater than the outside width W of the conveyor 1 itself; the drum's side walls and core 38, therefor, cooperate to provide structural means for guiding the conveyor 1 into a rolled-up or spiral configuration interiorly of the housing that is controlled and predetermined when the conveyor is retracted from the extended attitude into the storage attitude.

The housing's roof or ceiling 43 forms an opening 44 so that the roll-up conveyor 1 may be retracted into and extended from the housing 13, see FIG. 11. This mouth or opening 44 is provided with a guide track 45 that also aids in extending and retracting the conveyor from the housing in a smooth path. Note that the guide track is provided with spaced rails 46, the rails being spaced a distance one from the other substantially equal to the distance of the drum's side walls 37 one from the other so as to provide aid in rolling up the conveyor in the predetermined and controlled configuration on the drum 24 (i.e., to prevent misalignment of the conveyor 1 as it is retracted into the housing and to prevent misalignment of the conveyor as it is extended from the housing).

The roof braces 35 at the housing's rear or trailing end 31 also provide the mounting for a trailing fixed section 50 of roller conveyor, this fixed section incorporating a series of rollers 51 mounted between side rails 52 which are fixed to the roof braces, see FIGS. 1, 2 and 11. Note that this fixed section 50 presents its rollers 51 in a horizontal plane, i.e., parallel to floor 20 level, in both the extended or use attitude as well as the storage attitude of the conveyor 1 since same are permanently mounted to the top of the housing 13. Also, the fixed section 50 is in the same horizontal plane as the flexible side rail conveyor 1 when same extends horizontally outward (as opposed to angularly outward) from housing 13, the track 45 and fully retracted support frames 10, 14 so positioning the conveyor 1. Note further that only a small gap of distance G (as illustrated in FIG. 11) occurs between the flexible roller conveyor 1 that extends outwardly from the housing and the fixed roller section 50 mounted on the top of the housing, thereby providing conveyor continuity between two roll-up conveyor units if a second roll-up conveyor unit is mated or disposed in-line with a first unit so as to provide a conveyor run or path twice the length of that which can be provided from the embodiment illustrated in FIGS. 1 and 2.

The leading end 11 of the flexible conveyor 1 is also provided with a relatively short length 53 of fixed roller section, this section having a series of rollers 54 disposed therebetween. The solid side rails 55 of the fixed roller section 53 are pivotally connected at 56 to the leading link 57 of the flexible side rails 4. The length L of this fixed roller section 53 is generally dependent upon the number of primary 10 and secondary 14 support frames provided for the roll-up conveyor 1. That is, and as is illustrated in FIG. 3, the fixed roller section 53 at the leading end 11 of the flexible side rail conveyor 1 is of a length L so as to effectively overlie the fully retracted support frames 10, 14 and partially overlie the housing's track 45 so as to aid in providing relative rigidity to the overall assembly as same is moved from one use location to another when in the full storage attitude shown in FIG. 3.

The leading fixed section 53 of rollers 54 carries a drive mechanism 58 which allows all rollers 2 of the flexible side rail conveyor 1 and all rollers 54 of the leading fixed section 53 to be powered, see FIG. 1. The power transmission from roller to roller is described in detail below, but the power drive itself is interconnected with the forwardmost or leading roller 54a of the leading fixed section 53. As is shown in FIGS. 5 and 6 with more particularity, the leading roller's axle 59 mounts a sprocket 60, that drive sprocket being interconnected by chain 61 with a right angle gear box 62 powered by an electric motor 63. The gear box 62 and electric motor 63 hang from beneath the leading fixed section 53 in a substantially vertical attitude, same being mounted to a support bracket 64 welded as at 65 to one of the nonflexible side rails 55.

The primary support frame 10 is fixed as at 68 to the leading end of the leading fixed roller section 53. The primary support frame 10 incorporates a pair of hollow vertical posts 70 connected by cross frame members (not shown) each post carrying a horizontal foot 71. Rollers 12 are connected to each foot 71 in front and in back of the vertical post, i.e., substantially offset from the post's axis, for stability of the primary support frame. A hollow inner post 72 in the form of a gear rack is telescoped into each hollow outer post 70, and a pole 73 is telescoped into each hollow inner post 72. The poles 73 are welded, as at 74, to a cross plate 75 fixed to the underside of roller section 53, thereby fixing the primary support frame to that roller section 53. The primary support frame's crank mechanism 18 includes a primary frame crank 76 mounted on shaft 77 that extends between posts 70, the shaft being journalled into housings 78 that are part of the posts 70 and the shaft carrying a pinion gear 79 adjacent each post. The pinion gears 79 mesh with the hollow racks 72 through slot 80 in each post 70, rotation of the crank 76 causing the racks to vertically extend from or retract into the hollow posts 70, see FIG. 5. A latch bolt 81 is adapted to pass through each hollow rack 72 at the top thereof, that latch bolt cooperating with any of a plurality of holes 82 axially disposed along the pole 73 telescopingly engaged into that hollow rack, thereby allowing the poles 73 to be extended from or retracted into the hollow rack 72. An identical pinion gear 79 and telescoping pole 73/hollow rack 72/hollow post 70 structure is provided on each side of the fixed roller section 53, but the crank 76 is provided on only one side. Thus, each pair of hollow racks 72 is raised simultaneously because the pinion gears 79 are interconnected by shaft 77 that passes underneath the conveyor as illustrated in FIG. 2.

A latch device 83 cooperates with pinion gear 79 (see particularly FIGS. 5 and 7) and allows the primary support frame's vertically extensible hollow racks 72 to be maintained in desired elevational position relative to the hollow posts 70. The latch device 83 includes a bolt 84 and handle 85 mounted at right angles one to the other through a central shaft 86. The central shaft 86 is journalled for pivotal movement as at 89 in wall 87 of the post's housing 78. The handle 85 is made heavier than the latch bolt 84, the handle thereby always seeking to hang vertically downward as illustrated in FIG. 5. Thus, the latch bolt 84 is always loaded into latching relationship with the pinion gear's teeth 88, thereby precluding rotation of the pinion gears. This, of course, insures that the hollow racks 72 will maintain the desired vertically extended position relative to the posts 70.

A single secondary support frame 14 is shown in combination with the conveyor's housing 13 in the embodiment illustrated in FIGS. 1–7. This single secondary support frame 14 includes a pair of hollow posts 94 mounted on wheels 95 disposed on the post's axis, these outer posts being connected by cross frame members (not shown). The secondary frame's crank mechanism 19 includes two hollow posts 94 provided with pinion gears 93 interconnected by shaft 96, the pinion gear on one side being connected with crank 97 in a manner identical to that shown in FIGS. 5–7 for the primary support frame 10. Inner posts 98 (in the nature of racks as was the case with the primary support frame 10) are adapted to telescope into and out of the outer posts 94. The latch device 99 which maintains the inner posts 98 in desired vertical orientation, i.e., desired telescoped attitude, relative to the outer posts 94 is identical to that latch device 83 used with the primary support frame 10.

The tops of the inner posts 98 are connected by the floor plate or slide surface 15 fixed to both. This floor plate 15 is provided with upstanding guide rails 101 spaced apart a distance substantially equal to the fixed guide rails 46 mounted to the guide track 45 and, therefore, a distance substantially equal to the distance between the drum's walls 37. These side guide rails 101 are provided with outwardly flared leading 102 and trailing 103 ends so as to maintain the desired centered posiition of the conveyor on top the floor plate 15 provided by the secondary support frame 14. Thus, the secondary support frame 14 is not directly connected to the conveyor 1 but simply supports same on floor plate 15, the conveyor 1 being adapted to slide or move readily over that floor plate.

The secondary support frame 14 also mounts the pair of fingers 26 on leading edge 105 thereof, each of the fingers being pivotally mounted to the floor plate 15 on a pin 106. As is illustrated clearly in FIGS. 2 and 4, the fingers 26 are adapted to move between a solid line position where same engage a roller 2a of the conveyor 1 and a phantom line position where the rollers 2 may pass thereover without contact. The function of these pivotal fingers 26 will be described in detail below, but it will be recalled that the table plate 15 provided by the secondary support frame 14 simply allows the conveyor 1 to slide thereacross, i.e., the flexible link conveyor 1 in no sense is permanently attached thereto.

The hollow vertical main posts 94 of the secondary support frame 14 are permanently fixed to horizontal racks 16 disposed on each side of the housing 13. A drive shaft 116 journalled to depending wall 115 of the racks' sub-housings 17 drivingly connects the two racks 16, each rack being provided with a pinion gear 117 engaged with that rack, see FIGS. 1 and 4. The manually operated extend crank 25 is fixed to the drive shaft 116 and is located on the same side of the conveyor 1 as the cranks 76, 97 for the primary 10 and secondary 14 support frames, respectively. These racks 16 are each adapted to telescope into and out of the tubular sub-housings 17 pivotally mounted (adjacent trailing end 112 only, as at 113) to the trailing end 31 of the conveyor's housing 13. This pivotal mounting of the hollow sub-housings 17 allows the leading ends 114 of the sub-housings to move in a slight arcuate path. Such is accomplished by providing vertical slots 118 in the side walls 32 of the housing 13, these slots permitting slight up and down motion of the drive shaft 116. This structure constitutes an extender device for the secondary support frame 14 as the telescopable racks 16 (and, hence, the secondary support frame) is extendable away from and retractable adjacent to the housing's leading face 119 by rotating crank 25 since the racks 16 are fixed to the secondary frame's posts 94 as at 111. Further, when the secondary frame 14 is being extended and when fingers 26 are engaged with a roller 2a as shown in FIG. 4, extension of the secondary frame 14 automatically extends the conveyor 1 and the primary support frame 10.

As shown in FIGS. 1, 3 and 4 particularly, the leading face 119 of the conveyor's housing 13 mounts a downwardly disposed lip 120 that is adapted to cooperate with an upwardly disposed lip 121 fixed to the secondary support frame's floor plate 15. These lips or hooks 120, 121 are adapted to engage or overlap one with the other as shown in FIGS. 3 and 4. When the conveyor 1 is in the fully stored attitude as shown in FIG. 3, the entire unit rests on ground 20 level only on wheels 27, 95, 12 carried by the housing 13 and support frames 14, 10, respectively. This, of course, allows the unit to be easily transported or moved from one location to the other. This attitude occurs, however, only when the secondary support frame's hook 121 interengages the housing's hook 120 and the inner posts 98 of the secondary support frame 14 are slightly raised by crank 97, thereb lifting leading end 122 of the conveyor's housing 13 off ground 20 level. When the extended attitude illustrated in FIG. 1 is the case, i.e., when the primary 10 and secondary 14 support frames have been extended away from the housing's leading face 119 into a use attitude, hook 121 is removed from interengagement with hook 120 so that the conveyor housing's leading end 122 falls into contact with the ground 20. This frictional contact with ground 20 more or less fixes the conveyor's housing 13 in location (due to the weight of the conveyor's housing and attendant structure), and eliminates the need for brakes on the wheels 12, 95 of the primary 10 or secondary 14 support frames as well as on the wheels 27 of the conveyor's housing under common use conditions. It is this slight up and down movement of the conveyor housing's leading or front end 122 which is accommodated by the slots 118 in the conveyor housing's side walls 32. If such slots 118 were not present, and if the tubular sub-housings 17 for the secondary support frames' extend/retract racks 16 were not pivotally mounted as at 113 to the housing's rear end 31, such may well cause bowing or other structural malfunctions of the conveyor 1 and/or frame 14 extender mechanism.

In use, and as the flexible side rail conveyor 1 is extended from the total storage attitude to a partially extended use attitude (i.e., from the FIG. 3 attitude to the FIG. 1 attitude), crank 97 is first turned so that secondary frame's hook 121 is dropped from interengagement with housing's hook 120 (this, as mentioned, allows the secondary frame's rack 16/tubular sub-housing 17 structure to pivot about point 113, and allows the gear shaft 116 to move downwardly in the vertical slots 118, to prevent binding of racks 16 in sub-housings 17). This action allows the conveyor housing's leading end 122 to drop onto the floor 20, thereby more or less positively positioning the conveyor's housing 13 in a desired location due to the weight thereof.

Subsequently the extender device is operated to slide or extend the flexible link conveyor 1 outwardly from the conveyor's housing 13 over guide track 45 and secondary frame's floor plate 15. This extender device includes hand crank 25 and pivotable fingers 26, the pivotable fingers being moved into the solid line position illustrated in FIG. 4 and the crank thereafter being operated. Manual turning of the crank 25 forces racks 16 out of their tubular sub-housings 17 and, because the sub-housings are anchored to the conveyor's housing 13 and fingers 26 are prevented from counterclockwise rotational movement (as illustrated in FIG. 4), the conveyor 1 is forced or drawn out of the housing 13 as the secondary support frame 14 is moved on wheels 95 away from the housing 13 to the right as viewed in FIG. 14. Of course, the conveyor's leading end 11 is supported by the primary support frame 10 which, being fixed thereto, rolls away from the housing 13 on its wheels 12. When the secondary support frame's racks 16 have been fully extended relative to their sub-housings 17, same may be simply retracted back into their housings 17 by opposite manual rotation of the extension crank 25. Such will occur because the trailing rollers 2 will knock the pivotable fingers 26 down into the phantom line attitude illustrated in FIG. 4 during such retraction of the secondary support frame 14. Once the secondary support frame 14 is again in general proximity with the conveyor housing's leading end 122, the fingers 26 may be pulled back up into a solid line attitude illustrated in FIG. 4 and the secondary support frame thereafter once again forced away from the housing 13 by crank 25 to extend another section of the conveyor 1. This procedure is repeated until the conveyor 1 is at the desired extend attitude, or is fully extended, relative to the conveyor's housing 13. Of course, the fully extended attitude is limited by the interconnection of the conveyor to the drum's core 38 by ears 40.

Once the flexible side rail conveyor 1 has been extended to the desired location, the angular attitude of the conveyor may be located as desired, i.e., the height of the extended portion of the conveyor 1 may be varied along its length. In use, the telescoping racks 72 in the primary support frame's posts 70 are raised by first pivoting latch bolt 84 from interengagement with the pinion gear's teeth 88 into the phantom line attitude shown in FIGS. 5 and 7, the manual crank 76 then being used to raise, i.e., telescope, the tubular rack out of the posts 70. Once the desired vertical extension has been achieved, the latch device 83 is simply released and the latch bolt 84 falls into the latching attitude illustrated in solid lines in FIGS. 5 and 7 where same prevents further rotation of the pinion gears 79. If further vertical extension of the conveyor's leading end 11 is desired, the inner posts 73 are manually pulled upwardly out of the hollow racks 72, the desired position being retained by interengaging latch bolts 81 with the appropriate holes 82 in those inner posts 73. When the leading end 11 of the conveyor 1 has been elevated to the desired level, the intermediate portion of the conveyor's extended length may be elevated to a desired level (which is the same as or different from that set by the primary support frame 10) by use of the secondary support frame's crank mechanism 19. The secondary frame's crank mechanism 19 vertically extends the inner posts 98 relative to the frame's hollow legs 94 in a manner identical to that described for extension of the primary frame's hollow racks 72 relative to posts 70. A latch device 99 functions to retain the secondary frame's inner posts 98 in the same manner as the primary frame's latch device 83. Thus, the height of the conveyor 1 relative to the table top height H of the conveyor's housing 13 may be disposed as desired by an operator, and the angular attitude of the conveyor when viewed from the side may be disposed as desired by the operator, within extension limits of the primary 10 and secondary 14 support frames simply by positioning the primary and secondary support frames in the desired vertical attitude. Electric motor 63 is then energized once the conveyor 1 has been extended and vertically positioned, thereby positively driving all the rollers 2, 54 (except for those rollers 51 carried on the rigid section 50 mounted to the top of the conveyor's housing 13) through use of drive chain 61 and sprocket 60 connected to gear box 62. Of course, the conveyor 1 may be simply used as a gravity conveyor, and the electric motor drive 62, 63 eliminated if desired; but if such is the case, the rollers 2, 54 must be freely or independently rotatable relative one to the other.

To retract the conveyor 1 from the extended attitude, the secondary support frame 14 is retracted into proximity with the conveyor housing's front face 119 by use of the extension crank 25. The drum crank 23 is then rotated in that direction that causes the conveyor's side rails 4 to be wound onto the drum's core 38. As the flexible side rail conveyor 1 is wound onto the drum 24, primary support frame 10 is drawn toward the leading face 119 of the conveyor's housing 13 since it is on rollers and fixed at 68 to the conveyor 1. Of course, prior to retraction of the conveyor 1 into the housing 13, it is generally desirable to lower the primary 10 and secondary 14 support frames into their fully telescoped or storage attitude as illustrated in FIG. 3 if same have been vertically extended. Note particularly that, when the primary 10 and secondary 14 support frames are each fully telescoped or stored, the trailing fixed roller section 50 is coplanar with the leading fixed roller section 53, the conveying plane being located a height H off floor 20 level equal to the height of the housing's roof above floor level.

After the primary 10 and secondary 14 support frames have been disposed in proximity with the conveyor housing's face 119, the housing's hook 120 is interleaved with the secondary support frame's hook 121 and the secondary support frame's racks 98 then upraised slightly by use of hand crank 97. This, of course, lfits the leading end 122 of the conveyor's housing 13 off the ground 20 and allows the entire roll-up conveyor 1 unit to be supported on wheels 27, 95 and 12 only. The roll-up conveyor 1 unit may then be easily transported over, e.g., a warehouse, floor, from a use location to a storage location or to another use location.

An alternative roll-up conveyor unit embodiment, primarily based on the roll-up conveyor 1 structure illustrated in FIGS. 1-7, is illustrated in FIG. 8. In this alternative conveyor unit embodiment the rollers 124 are not powered, i.e., the roll-up section of the conveyor constitutes a gravity type roller conveyor. However, the leading end 125 of the flexible side rail roller conveyor is pivotally connected, as at 126, with a power driven belt type conveyor 127. The power driven belt 128 is disposed around idler roller 129 carried for rotation in bracket 130 fixed to the top posts 131 of the secondary support frame 132. Electric motor 123 is interconnected with gear box 123a, the gear box providing a chain and sprocket drive 123b mounted on the belt's drive roller, 133; thus, the belt is positively driven. Drive roller 133 at the leading end 134 of the belt conveyor 127 is carried for rotation in brackets 135 mounted to the top posts 136 of the primary support frame 137. The primary 137 and secondary 132 support frame are disposed on rollers 138, thereby allowing those support frame to roll over ground 20 level. The basic structural concept for the support frames 137 and 132 are the same as described for the support frames 10, 14 of the FIGS. 1-7 embodiment, and the structure of the conveyor's housing 13 and internal structure are the same as described for the FIGS. 1-7 embodiment.

An alternative embodiment illustrated in FIG. 8 is particularly useful in connection with loading and/or unloading cargo trailers at a warehouse's loading dock. The power assist section 127 of the roll-up conveyor 1 is positioned so that primary support frame 137 rests on the trailer's bed or floor 139 with the secondary support frame being located on the warehouse's floor 140 adjacent the dock 141, the trailer's cargo being initially positioned on the powered belt 128. The support frames 132, 137 are adjusted so that the high point 128a of the conveyor's path is located at the connection 126 of the belt conveyor 127 with the gravity type roller conveyor 1 at the secondary support frame, such a point being provided by vertically adjusting the telescoping inner posts 131, 136 of each frame by cranks 142, 143, respectively. This allows boxes or the like (not shown) to roll down toward the conveyor's housing 13 from the high point of the conveyor path after the boxes have been delivered to that point by the drive belt 128.

An alternative embodiment of the primary 10 and secondary support frame 14 struucture is illustrated in FIGS. 9 and 10. This alternative support frame structure may be substituted for the support frame structure illustrated for the conveyor unit embodiments shown in FIGS. 1-7 and in FIG. 8. As shown in FIGS. 9 and 10, there may be provided a series of support frames 145, 166 adapted to rest on a tray 146 when in the storage attitude, each of the frames mounting wheels 144 at the base thereof. The tray 146 is provided with angulated side walls 147 and a floor 148, the floor being of a length sufficient to retain all support frames 145 thereon when same are fully retracted adjacent the front face 119 of the conveyor's housing 13.

Each side of the tray 146 is fixed to a vertically disposed rack 149, each rack being disposed in a hollow tubular sleeve 150 fixed to each leading corner 151 of the conveyor's housing 13. A pinion gear 152 is provided to cooperate with each of the racks 149, each gear being journalled in housing 153 integral with its associated sleeve 150. A hand crank 154, disposed on the same side of the conveyor's housing 13 as the drum crank (not shown), is fixed to gear shaft 155. Rotation of that crank 154, of course, raises and lowers the tray 146 relative to ground 20 level. A latch device 156, identical to that illustrated in FIGS. 5 and 7, is provided so as to retain the tray 146 in the desired elevated attitude. In effect, the rack 149/hollow sleeve 150/pinion gear 152 structure is the same structural concept as that incorporated in the primary 10 and secondary 14 support frames illustrated in FIGS. 1, 2, 5 and 7.

The support frames 145 are each (except for leading pair 166) comprised of a pair of posts 157 connected by a cross member or guide plate 158 at the top thereof. The flexible side rail conveyor 1 is adapted to ride or slide over these guide plates 158, i.e., each pair of intermediate or secondary support posts 157 is not fixedly connected to the conveyor 1. But the leading or primary pair 166 of support posts 157 is fixedly connected as at 167 to the nose portion 168 of the conveyor's leading rigid section 169, this rigid section being analogous to the leading rigid section 53 in the FIGS. 1-7 embodiment. Each guide plate 158 is provided with downwardly flared leading 170 and trailing 171 edges so as to enhance easy movement of the flexible side rail conveyor 1 over that guide plate.

Each support frame 145 is slidingly connected with an extender device that includes a horizontal telescope structure 159 fixed to the conveyor housing's side walls 32, see FIG. 9. The horizontal telescope structure 159 is duplicated on each side of the housing 13, each side including a series 160 of hollow tubes 161 telescoped one into the other. A housing 172 for the horizontally telescoping tubes 161 is fixed to each of the housing's side walls 32, thereby fixing the tubes 161 to those side walls and limiting their extension length. Extension of one tube relative to the other within each series 160 is limited by means of brake 162 at the leading end of an outer tube and stop 163 at the trailing end of an inner tube.

Each hollow tube 161, at its leading end 164, carries a vertical collar 165 fixed thereto. A frame support post 157 is slidingly disposed within each one of these vertical collars 165, the vertical posts 157 on opposite sides of the housing being disposed in corresponding collars 165 fixed to corresponding tubes 161 in the telescope structure 159. Thus, the frames 145 are movable toward and away from the housing's front face 119 by means of telescope structure 159, and are movable vertically by means of collars 165.

In use, this alternative frame 145 embodiment of the roll-up conveyor 1 is particularly adapted for leading and unloading a trailer backed up to the loading dock of a warehouse where the trailer's bed 139 is at a level elevated above the warehouse's floor 20. When such an operational situation occurs, and when the flexible side rail conveyor 1 is fully retracted into tis housing (as shown in FIG. 3 for a similar embodiment), all the support frames 145 are disposed on the tray 146. Note particularly that the wheels 144 of the support frames 145 are laterally and alternately offset relative one to the other so as to permit closer nesting of the support frames one to the other on the tray 146, and to the front face of the conveyor's housing, in the storage attitude. The crank 154 is manually operated to extend the tray's racks 149 vertically upward relative to the tray's sleeves 150 until the tray 146 is located at a vertical attitude substantially coplanar with the trailer's floor 139.

In this attitude, the conveyor's fixed section 169 or primary support frame 166 is grasped manually and simply pulled outwardly away from the conveyor's housing 13 into the interior of the trailer. As the conveyor 1 is so extended or paid out from the conveyor housing 13, intermediate or secondary support frames 145 are paid out in sequence from their storage attitude relative to the housing, and the number of such frames so paid out is dependent upon the length of conveyor 1 extended from the housing. That is, and for example, as the leading or primary support frame 166 is pulled outwardly a distance substantially equal to its rigid section 169, the stop 163 at the trailing end of telescope element 161a interengages the brake 162 at the leading end of telescope element 161b, thereby drawing the first secondary support frame 145a outwardly therewith.

As the conveyor 1 is wound up by the use of a crank (not shown, but analogous to crank 23 for the embodiment illustrated in FIGS. 1–7) into the conveyor's housing 13, the leading or primary support frame 166 simply stacks up the secondary support frames 145 as element 161a telescopes in sequence back into the storage attitude partially illustrated in FIG. 9. In the full storage attitude all frames 145, 166 are disposed on the tray, i.e., all wheels 144 are located on the tray, and fixed section 169 at the leading end of the conveyor 1 extends over the cross supports 158 that interconnect each pair of support posts 157 to form an integral unit. Thereafter, the tray 146 is simply lowered into general proximity with floor 20 level and the conveyor unit transported as desired to a storage location or a different use location.

Two different spiral configurations that the roll-up conveyor may take, when in the storage attitude within the conveyor's housing 13, are illustrated in FIGS. 11 and 18. In each instance, however, structural means is provided which guides the roll-up conveyor into and out of the storage attitude within the housing 13, and which insures that the conveyor will be rolled dup into a controlled and predetermined spiral configuration. In the FIG. 11 embodiment, which is also that embodiment illustrated in FIGS. 1–8, the spiral configuration is generally circular. This for the reason that drum 24 having opposed side walls 37 and a cylindrical core 38 is provided onto which the flexible rail conveyor 1 is adapted to wind as previously described. The side walls 37 of the drum 24 cooperate with the side rails 4 of the conveyor 1 to insure that the rails 4 are wound up in generally circular spiral configuration, and to insure that the wind up or storage attitude is such that each of the side rails as wound up on the drum are in substantially the same plane, i.e., such that each side rail's spirals are not offset relative one to the other in the rolled up attitude. This is important when the rollers 2 are power driven to insure that the rollers are maintained out of contact one with the other in the rolled up attitude.

In the FIG. 18 embodiment, the rolled up side rail 180 configuration is shown as generally elliptical. This rolled up configuration has a couple of advantages over that circular spiral configuration illustrated in FIG. 6. In the first instance, and if there is a design limitation of the height H of the conveyor's housing 13, a substantially longer length of flexible side rail conveyor 181 may be stored in a housing where it is stored in elliptical spiral configuration than where it is stored in circular spiral configuration. Second, the from a manufacturing expedient standpoint where different length roll-up conveyors are being fabricated, only the length L' of middle or straight track sections 182 of the elliptical spiral windup configuration need be changed to change the storage capacity of that particular roll-up conveyor embodiment. More specifically, and in the embodiment illustrated in FIG. 18, each side wall 32 of the conveyor's housing 13 is provided with a track 183 having an interior terminal end 185 provided with stop 179, and extending into general proximity with a feed sprocket 186. The track 183 is comprised of upper and lower rails 187 in a generally elliptical spiral configuration, that configuration incorporating straight intermediate sections 182 and arcuate end sections 184 which are formed together to provide a continuous generally elliptical path interiorly of the conveyor's housing.

The flexible side rails 180 of the conveyor 181 are provided with a series of idler rollers 188 on the exterior thereof, these rollers being independently rotatable relative to the rollers 189 of the conveyor and being adapted to ride within the generally elliptical spiral track 183 provided interiorly of the conveyor's housing. A feed sprocket 186 on each side of the housing is fixed on drive shaft 190, each feed sprocket being adapted to engage the idler rollers 188 mounted to the exterior face of each of the flexible side rails 180.

In use, rotation of a manual crank (not shown) fixed to the drive shaft 190 causes simultaneous rotation of the feed sprockets 186, thereby paying the flexible side rail conveyor 181 out of the conveyor's housing 13 or retracting it into the conveyor's housing. A lug 191 may be provided on a conveyor's side rail 180 adjacent the last idler wheel 188a if desired. This lug cooperates with a stop 192 fixed to the track 183 adjacent feed sprocket 186, thereby preventing the flexible length conveyor 181 from being extended or withdrawn entirely out of the conveyor's housing. This stop 191/192 arrangement is, of course, not needed in connection with the generally circular spiral configuration arrangement illustrated in FIG. 11 since in that embodiment the inner end of the conveyor's side rails 4 are positively fixed to the drum's core 38 by ears 40.

While the generally circular spiral configuration illustrated in FIG. 11 is the one illustrated in those embodiments of the conveyor shown in FIGS. 1, 2, 4, 5 and 8–10, it will be apparent that the generally elliptical spiral configuration shown in FIGS. 18 and 19 may also be used in connection with the support frame structural concepts disclosed in those FIGS.

Side Rail Construction

As noted, the conveyor's side rails 4, 180 are of a novel linkage 5, 6 structure that permits breaking of the side rails so the conveyor can be wound up when force is applied in an upward direction and prevents breaking of the side rails (i.e., maintains those side rails in a rigid attitude) when force is applied in a downward direction, see particularly FIGS. 12–15. Each side rail 4 is fabricated of support links 5 and connecting links 6 in alternate combination, each support link having a connecting link pinned at opposite ends.

Each support link 5 is U-shaped in cross-sectional configuration, each connecting link 6 being trapped between the support link's side walls 201 when the connecting link is pinned thereto. More specifically, note that each support link 5 is generally trapezoidal in configuration, the minor parallel side of each support link providing the base 206 of the U-shaped support link. Each pair of parallel side walls 201 define a pinhole 204 at each end of the support link 5, the pinholes being adapted to receive a collar 205 to establish the pinned interconnections with the associated connecting links 6. Note particularly that the base 206 of each U-shaped support link 5 is in the nature of a lip adapted to cooperate with the associated connection links 6 as described in detail below.

Each connecting link 6 is planar or plate-like in configuration. More particularly, each connecting link 6 is also generally trapezoidal in configuration, and the major parallel side 207 defines feet 208a, 208b adapted to pivot into and out of supporting contact with the base of successive support links 5. Each connecting link is provided with a pinhole 209 at each end of the connecting link 6, the pinholes being sized to receive collars 205, too, to establish the pinned interconnections with the associated support links 5.

Each link assembly, which includes a connecting link 6 and a support link 5 in pinned combination, is provided with a spacer plate 210 for lateral rigidity of the side rail 4, 180. The spacer plate 210 is paired with the connecting link 6 in assembly, and is of a generally rectangular figuration sized to conform with the rectangularly configured center portion 211 of the connecting link 6. The spacer plate 210 is provided with notched ends 212 adapted to interfit the collars 205 which cooperate to form the pinned connections of each connecting link 6 with respective support links 5 on each side thereof.

The spacer plate 210/connecting link 6/support link 5 assembly for each side rail 4, 180 is held in assembled relation by bolts 213, the holes 209, 204 in the respective links 5, 6 being sized to accommodate the collar 205 which surrounds each bolt so as to maintain relatively exact tolerances between successive links and to provide a smooth bearing surface about which the links may pivot relative one to the other. The bearings 214 at each end of each roller 22 are fixed to the side rails 4, 180 be these bolts 213, too, thereby rotatably mounting the rollers to the side rails.

Note particularly that, when assembled, the base 206 of the U-shaped support links 5 define the bottom edge 215 of each side rail 4, 180. Note also that the bottom edges 216 of each connecting link's feet 208 are adapted to rest on the adjacent support links' lips or bases 206 when the conveyor 1 is extended; this provided the vertically downward rigidity for the conveyor's side rails 4, 180 when the conveyor is extended in a rigid, in-line use attitude. Note further that the maximum break permitted between each support link 5 and connecting link 6 is that angular or broken line conveyor attitude established where the connecting link's bottom offset edge 203 engages (and is stopped from further pivotal motion by) the transverse end edge 202 of the adjacent support link's lip 206. Thus, each connecting link 6 is adapted to pivot relative to its associated support link 5 between an in-line position (shown in FIG. 12) where edge 216 of foot 208 abuts the support link's lip 206 and an angulated or broken line position (shown in FIG. 11) where offset edge 203 abuts the lip's transverse end edge 202. The depth D of the offset, in effect, controls the length of the pivot arc. Note further that the connecting links 6 are sized so that the top edges 217 thereof are coplanar with the support links' top edges 218 when the side rails 4, 180 are in the extended configuration; this is particularly important as it provided a rail structure of four plate thicknesses in width which is of aid in seating the conveyor in rolled-up configuration when the circular spiral configuration as shown in FIGS. 11 and 13 is used.

Alternate connecting links 6 and spacer plates 210 have a V-shaped pinch-prevent plate 219 welded to the outer surface 220 thereof. These pinch-prevent plates 219, in effect, provide a continuous outer side wall surface 221 comprised of the outermost wall 201a of the support links 5 and the exposed surfaces 222 of the pinch-prevent plates, thereby substantially reducing the potential pinching hazard to an operator's hands as successive links 5, 6 of the side rails are pivoted relative one to the other upon rolling up the conveyor into the storage attitude or extending the conveyor into the use attitude.

The rollers 2, of couse, extend between the respective side rails 4, 180 of the conveyor 1. Each roller 2 is provided with a circumferential ring gear 223 at each end thereof. An idler gear 224 is mounted to the inner wall 201b of each support link 5 by bolt 225, the idler gear being meshed with ring gear 223 on the rollers 2 ahead and behind it. Note, as illustrated in FIG. 12, that the idler gears 224 alternate from right to left between succeeding pairs of rollers 2. Note further that the trailing hole of a U-shaped support link 5 on one side rail 4, 180 is connected by a roller 2 with the leading hole of the U-shaped support link on the opposite side rail. This assembly allows simplicity and economy in the manufacture of the side rail links 5, 6 as the same link parts may be used for both side rails. Further, this allows for easier assembly of the structure during production as it eliminates the need for right and left hand parts, as well as the need for maintaining of those parts separate one from the other.

It will be racalled that the conveyor's rollers 2 are rotated by the drive unit 58 mounted at the conveyor's leading end 11 as illustrated particularly in FIGS. 1, 5 and 8. Rotation of the rollers 2 is imparted thereto through drive sprocket 60, all rollers being interconnected with that drive sprocket through the ring gear 223/idler gear 224 structure provided each of the rollers. An important feature of this invention is that the conveyor's power drive unit 58 is operable even when the conveyor 1 is partially rolled up within the conveyor's housing, thereby allowing the rollers 2 to be powered even when the conveyor is only partially extended. In the FIG. 11 configuration, of course, the conveyor's side rails 4 are directly wound in spiral configuration upon themselves about the drum's core 38, the side rails being maintained in their respective planes by opposed walls 37 of the drum 24 to aid in insuring that the structural link 5, 6 configuration maintains the rollers 2 out of contact one with the other as illustrated in FIG. 11. In the generally circular spiral roll-up configuration, where each side rail's links 5, 6 are guided one upon the other there is o orientation where the rollers are closer one to the other than as shown in FIG. 13, and the width W' of the links 5, 6 is sized such that roller 2 to roller contact is not possible in that orientation. In the generally elliptical spiral roll-up configuration illustrated in FIG. 18, the rollers 2 are specifically guided into the storage attitude by tracks 183 fixed on opposed side walls of the conveyor's housing 13, these tracks being spaced apart so that the rollers do not touch when in the storage attitude.

As illustrated in FIG. 14, the idler gears 224 are simply rotatably fixed to the connecting links by bolts 225. An alternative embodiment of the idler gears 224 is illustrated in FIGS. 15 and 16. As shown in those two FIGS., an upper 226 and a lower 227 guard are fixed to the connecting link 6 as at 228, the guards being adapted to span between successsive conveyor rollers 2 over the idler gear 224. This guard 226, 227 structure aids in reducing the possibility of an operator's fingers becoming caught in the pinch points 229 between an idler gear 224 and its related conveyor roller 2 as those rollers are positively rotated by the conveyor's drive. This pinch point elimination is particularly useful in reducing operating hazards of the conveyor 1 to those personnel charged with its operation.

An alternative embodiment of the side rail's link 5, 6 structure is illustrated in FIG. 17. As shown in this embodiment, the outer wall 231 of each support link 5 is provided with a raised section 232 that extends substantially above the conveying surface of the conveyor's rollers 2. These raised sections 232 provide, in effect, guide rails for the roll-up conveyor to aid in preventing boxes or the like from falling off the conveyor unit during movement thereon.

In this alternative link 5, 6 structure shown in FIG. 17 and 17a, alternate connecting links 6 and spacer plates 210 have a V-shaped pinch-prevent plate 235 welded to the outer surface thereof in much the same general location as shown in FIG. 12 except that the plates 235 are positioned so the top edge 236 of each extends inline with the top edge 237 of the adjacent support links' wall 231. These pinch-prevent plates 235, in effect, provide a continuous outer side wall surface as well as a continuous upper edge 236, 237 for each side rail. The continuous upper edge 236, 237 insures that boxes (not shown) or the like do not get hung up in the gap that would otherwise be present between successive support links 5.

Having described in detail the preferred embodiments of my invention, what I desire to claim and protect by Letters Patent is:

1. A roll-up conveyor unit comprising
    a roll-up conveyor having opposed flexible side rails, said side rails having a plurality of one of rollers and skate wheels fixed therebetween,
    a housing within which said roll-up conveyor may be wound for storage and from which said conveyor may be paid out for use,
    a primary support frame fixed to the free end of said roll-up conveyor for support of said conveyor at the free end during use,
    at least one secondary support frame connected to said housing, said secondary support frame providing a floor plate over which said conveyor is adapted to slide as said conveyor is paid out from said housing, and said secondary support frame being adapted to support said conveyor intermediate its length when same is in the extended position,
    an extender device fixed to said housing for driving said secondary support frame between a storage position adjacent said housing and a use position intermediate the extended length of said conveyor, and
    connector means selectively interconnecting said extension means and said roll-up conveyor, said connector means operating to connect said extension means and said roll-up conveyor as said extension means drives said secondary support frame from the storage position to the use position, and said extension means being disconnected from said roll-up conveyor as said extension means drives said secondary support frame from the use position to the storage position, thereby positively driving said roll-up conveyor from the conveyor's storage position in response to movement of the secondary support frame away from the secondary support frame's storage position.

2. A roll-up conveyor unit as set forth in claim 1,
    each of said primary and secondary support frames including
    an inner post and an outer post, said posts being vertically extendable relative one to the other for positioning said roll-up conveyor as desired by an operator, and
    wheels fixed to said support frames, said wheels permitting said support frames to roll away from and toward said housing as said roll-up conveyor is extended from and retracted into said housing, respectively.

3. A roll-up conveyor unit as set forth in claim 2 each of said primary and secondary support frames including
    pinion gear and rack means associated with the posts of each of said frames, said pinion gear and rack means being adapted to vertically extend said posts relative to one another, and
    a latch device associated with each of said pinion gear and rack means, said latch device being continuously biased into the latching attitude to retain said posts in desired vertically extended relation.

4. A roll-up conveyor unit as set forth in claim 1 including
    telescope structure which connects said secondary support frame and said housing, said telescope structure permitting said secondary support frame to extend away from and to retract toward the storage position in response to operation of said extension means while remaining directly connected to said housing through said telescope structure.

5. A roll-up conveyor unit as set forth in claim 1, said extension mens including
    a horizontally disposed rack fixed to one of said secondary support frame and said housing, and a hollow sub-housing for said rack fixed to the other of said secondary support frame and said housing, and a pinion gear fixed to said sub-housing, said pinion gear being rotatable to extend said secondary support frame away from said housing and retract said secondary frame toward said housing.

6. A roll-up conveyor unit as set forth in claim 1, said connector means including
at least one finger mounted to said secondary support frame, said finger being structured to grip said conveyor as said secondary support frame is extended away from said housing, and to release said conveyor as said secondary support frame is retracted toward said housing.

7. A roll-up conveyor unit comprising
a roll-up conveyor having opposed flexible rails, said rails having a plurality of one of rollers and skate wheels fixed therebetween,
a housing within which said roll-up conveyor may be wound for storage and from which said conveyor may be paid out for use,
at least a primary support frame fixed to the free end of said roll-up conveyor for support of said conveyor at the free end during use,
a tray connected to said housing, each support frame being located on said tray in storage attitude when said roll-up conveyor is fully retracted into said housing in storage attitude, and
a raise/lower device connected to said tray, said device being adapted to raise said tray above that floor level on which said housing is located to a preferred use level, thereby permitting each support frame to be located at the preferred use level prior to moving said support frame away from said housing into the use position.

8. A roll-up conveyor unit as set forth in claim 7 including
at least one secondary support frame connected to said housing, said secondary support frame providing a floor plate over which said conveyor is adapted to slide as said conveyor is paid out from said housing, said secondary support frame being adapted to support said conveyor intermediate its length when same is in the extended position, and said secondary support frame being movable between a storage position on said tray and a use position off said tray intermediate the extended length of said conveyor.

9. A roll-up conveyor unit as set forth in claim 8 including
telescope structure which connects said primary and secondary support frames, said telescope structure permitting said support frames to extend away from and to retract toward the storage position in sequence relative to said housing.

10. A roll-up conveyor unit as set forth in claim 9, said telescope structure including
a first post fixed to said primary support frame at one end thereof,
a second post fixed to said secondary support frame at one end thereof, said first post being telescopingly engaged with said second post, and
stop means mounted to said posts to prevent said posts from being removed from telescoping engagement one with the other.

11. A roll-up conveyor unit as set forth in claim 10, said telescope structure further including
a third post fixed to said housing at one end thereof, said third post being telescopingly engaged with said second post, thereby directly connecting said support frames to said housing.

12. A roll-up conveyor unit as set forth in claim 10, said raise/lower device including
a vertically disposed rack fixed to one of said tray and said housing,
a pinion gear connected to the other of said tray and said housing, rotation of said pinion gear causing said tray to be raised or lowered as desired relative to said housing, and
said telescope structure including
a vertically disposed collar fixed to each post, said primary and secondary support frames being slidingly received in said respective collars, said support frames thereby being vertically movable relative to said posts during operation of said raise/lower device.

13. A roll-up conveyor unit as set forth in claim 7, said raise/lower device including
pinion gear and rack means associated with said housing and said tray, said pinion gear and rack means being adapted to vertically move said tray relative to said housing, and
a latch device associated with said pinion gear and rack means, said latch device being continuously biased into the latching attitude to retain said tray in the desired vertical position.

14. A roll-up conveyor unit comprising
a roll-up conveyor having opposed flexible link side rails that are rigid in the vertically downward direction when extended into use configuration, but flexible in the vertically upward direction to permit wind up into storage configuration,
a plurality of one of rollers and skate wheels disposed on fixed axes between said side rails,
a housing into which said roll-up conveyor may be wound to position same in a storage attitude and from which said conveyor may be paid out to establish same in a use attitude,
a primary support frame fixed to the leading end of said roll-up conveyor, said primary fixed frame being extended away from and retracted towards said housing as said roll-up conveyor is paid out of and retracted into said housing, respectively,
at least one secondary support frame connected to said housing, said secondary support frame providing a floor plate over which said conveyor is adapted to slide as said conveyor is paid out from said housing, said secondary support frame being adapted to support said conveyor intermediate its length when same is in the extended position, and said secondary support frame being movable between a storage position adjacent said housing and a use position intermediate the extended length of said conveyor in response to extension of said conveyor from said housing,
each of said primary support frame and at least one secondary support frame including an inner post and an outer post which are vertically extendable relative one to the other for positioning said roll-up conveyor as desired by an operator,
height adjustment means associated with the posts of each of said frames, said height adjustment means being adapted to vertically extend said posts of each of said frames independent of and relative to the posts of the other of said frames to permit the height of said conveyor at said primary support frame to be positioned as desired relative to and different from the height of said conveyor at said secondary support frame when said conveyor is extended into use configuration, and a latch device associated with each of said height adjustment means, said latch device being movable into the latching attitude to retain said posts in the desired vertical position.

15. A roll-up conveyor unit as set forth in claim 14 wherein said height adjustment means includes rack and pinion gear means.

16. A roll-up conveyor unit comprising a roll-up conveyor having opposed flexible link side rails that are rigid in the vertically downward direction when extended into use configuration, but flexible in the vartically upward direction to permit wind up into storage configuration, a plurality of one of rollers and skate wheels disposed on fixed axes between said side rails, a housing into which said roll-up conveyor may be wound to position same in a storage attitude and from which said conveyor may be paid out to establish same in a use attitude, a spirally configured track mounted inside said housing, a series of idler rollers fixed to at least one of said conveyor's side rails, said idler rollers being received in and guided by said track, a feed sprocket adapted to engage said idler rollers, said feed sprocket being rotatable to extend said roll-up conveyor from, and retract said roll-up conveyor into, said housing, a primary support frame fixed to the leading end of said roll-up conveyor, said primary fixed frame being extended away from and retracted towards said housing as said roll-up conveyor is paid out of and retracted into said housing, respectively, at least one secondary support frame connected to said housing, said secondary support frame providing a floor plate over which said conveyor is adapted to slide as said conveyor is paid out from said housing, said secondary support frame being adapted to support said conveyor intermediate its length when same is in the extended position, and said secondary support frame being movable between a storage position adjacent said housing and a use position intermediate the extended length of said conveyor in response to extension of at lest one of said conveyor and said primary support frame from said housing, and height adjustment means associated with said primary support frame and at least one secondary support frame, said height adjustment means cooperating with said frames to locate the vertical position of said conveyor independent of the length of said conveyor when said conveyor is paid out into the use attitude.

17. A roll-up conveyor unit as set forth in claim 16, said track having one of a generally elliptical path and a generally spiral path within said housing.

* * * * *